United States Patent
Murphy et al.

(10) Patent No.: US 7,185,436 B2
(45) Date of Patent: Mar. 6, 2007

(54) MULTI-POSITION PEELER APPARATUS

(75) Inventors: Mark Phillip Murphy, Yorba Linda, CA (US); Belinda Martinez, Oceanside, CA (US); Christopher Lawrence Hawker, Columbus, OH (US); Takayuki Matsuo, Chula Vista, CA (US); Patrick Joseph Bertke, Columbus, OH (US); Steven Andrew Sauer, Columbus, OH (US); Catherine Healy Shaw, Laguna Beach, CA (US); Kristen Karl Hedstrom, Humboldt, TN (US)

(73) Assignee: Kyocera Tycom Corporation, Irvine, CA (US)

( * ) Notice: Subject to any disclaimer, the term of this patent is extended or adjusted under 35 U.S.C. 154(b) by 0 days.

(21) Appl. No.: 10/942,572

(22) Filed: Sep. 16, 2004

(65) Prior Publication Data
US 2005/0217122 A1    Oct. 6, 2005

Related U.S. Application Data

(60) Provisional application No. 60/557,614, filed on Mar. 30, 2004.

(51) Int. Cl.
*B26B 1/04* (2006.01)
(52) U.S. Cl. ............... 30/279.6; 30/123.6; 30/314; 30/321
(58) Field of Classification Search ............ 30/123.5, 30/123.6, 155, 279.6, 321, 531; 99/542–543, 99/545, 584, 588, 592–593, 585; D7/372, D7/693–696
See application file for complete search history.

(56) References Cited

U.S. PATENT DOCUMENTS

| | | | | | |
|---|---|---|---|---|---|
| 44,044 | A | * | 8/1864 | Howland | 99/588 |
| 124,443 | A | * | 3/1872 | Knight | 403/68 |
| 948,573 | A | * | 2/1910 | Chase | 30/279.6 |
| 1,192,503 | A | * | 7/1916 | Crane | 30/47 |
| 1,475,816 | A | * | 11/1923 | Hall | 30/321 |

(Continued)

FOREIGN PATENT DOCUMENTS

JP         2280789       * 11/1990

OTHER PUBLICATIONS

Kyocera Tycom, Ceramic Peeler (CP-08).

(Continued)

*Primary Examiner*—Boyer D. Ashley
*Assistant Examiner*—Carolyn Blake
(74) *Attorney, Agent, or Firm*—Stetina Brunda Garred & Brucker

(57) ABSTRACT

A peeler apparatus is provided having an ergonomic handle and a blade that can be rotated relative to the handle to accommodate different peeling styles. The blade can be rotated in order to position the blade in a variety of positions relative to the handle. Such positions include perpendicular, parallel left, parallel right, 45 degree left, and 45 degree right positions. Variations of the peeler can be provided which enable rotations of 180 degrees, 360 degrees, and/or other angles as desired. A user-operable knob cooperatively engaged with a yoke permits the yoke and a blade secured to the yoke to rotate relative to the handle in response to rotation of the knob. A peeler having a blade fixed at approximately 45 degrees relative to the handle is also provided.

20 Claims, 3 Drawing Sheets

U.S. PATENT DOCUMENTS

| | | | |
|---|---|---|---|
| 1,502,627 A * | 7/1924 | Hammond | 30/321 |
| 1,593,459 A * | 7/1926 | MacFalls | 30/53 |
| 2,031,191 A * | 2/1936 | Swedeland | 30/279.6 |
| 2,121,000 A * | 6/1938 | Anderson | 30/47 |
| 3,009,245 A * | 11/1961 | Senkewitz | 30/155 |
| 3,964,160 A * | 6/1976 | Gordon | 30/531 |
| 4,083,103 A * | 4/1978 | Estandian | 30/47 |
| 5,093,991 A * | 3/1992 | Hendrickson | 30/531 |
| 5,279,035 A | 1/1994 | Cohen et al. | |
| 5,526,568 A * | 6/1996 | Copelan | 30/531 |
| 6,186,058 B1 | 2/2001 | Ehrig, Jr. et al. | |
| 6,318,222 B1 * | 11/2001 | Weinman, Jr. | 83/13 |
| 6,336,271 B1 * | 1/2002 | Rider et al. | 30/162 |
| 6,408,520 B1 | 6/2002 | Ridler | |
| 6,412,177 B1 | 7/2002 | Ridler | |
| 6,619,194 B1 | 9/2003 | Kuan | |
| 2005/0028384 A1* | 2/2005 | Hughes | 30/279.6 |

OTHER PUBLICATIONS

Kyocera Tycom, Ceramic Peeler (CP-10).
Progressus, 4 in 1 Julienne Shredder.

* cited by examiner

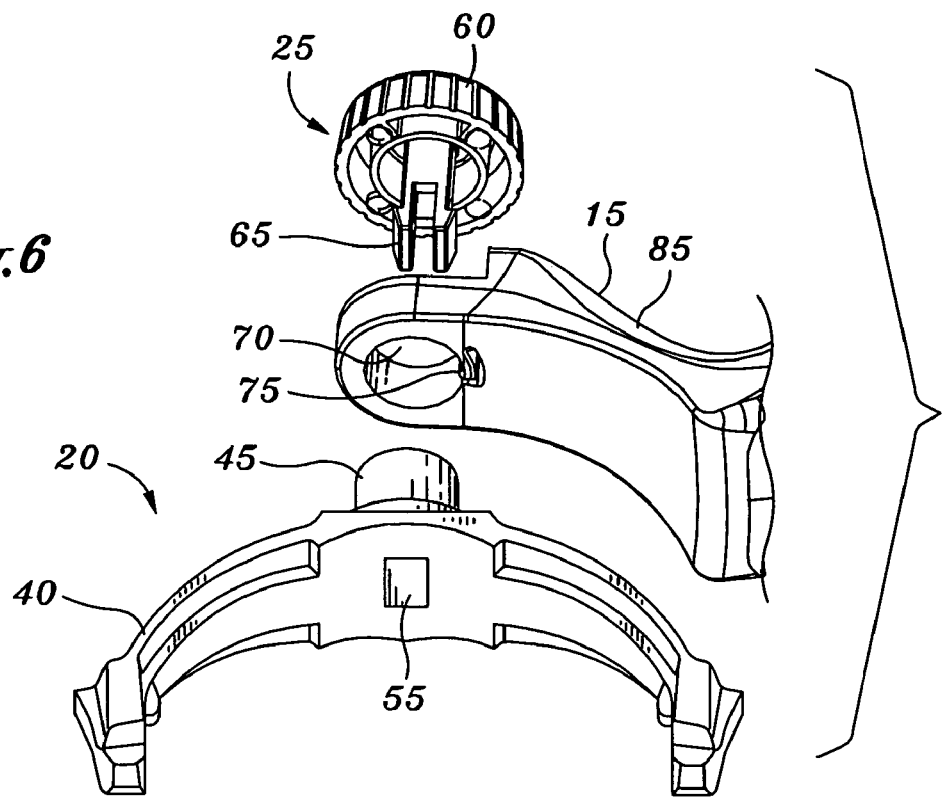
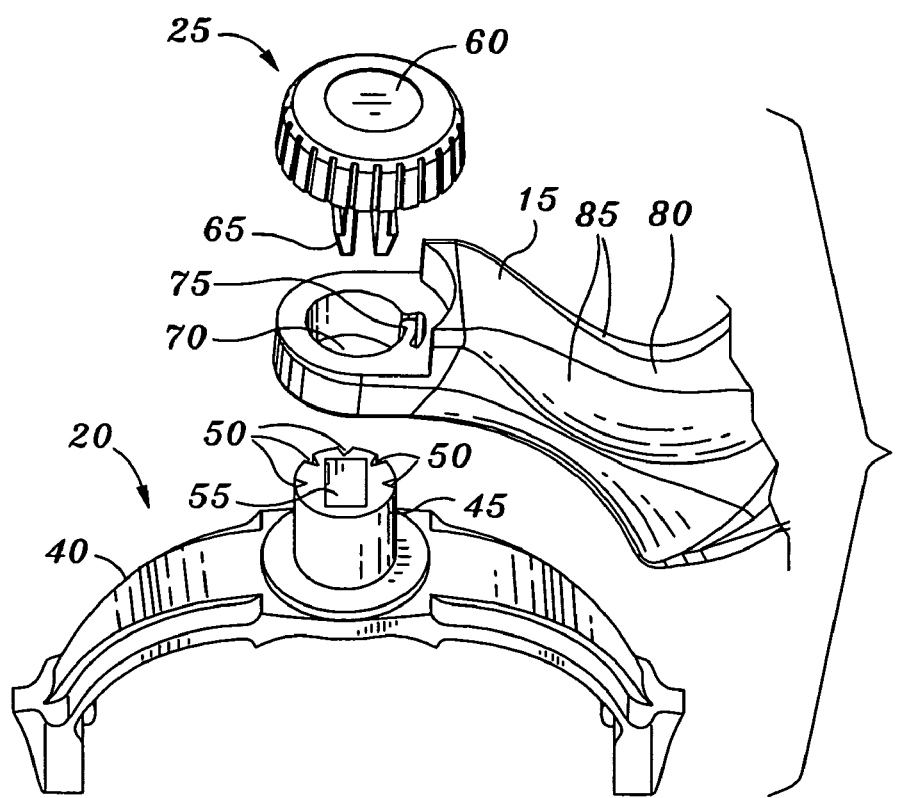

MULTI-POSITION PEELER APPARATUS

CROSS-REFERENCE TO RELATED APPLICATIONS

This application relates to and claims the benefit of U.S. Provisional Application No. 60/557,614 filed Mar. 30, 2004 and entitled Multi-Purpose Peeler Apparatus, which is incorporated by reference herein.

STATEMENT RE: FEDERALLY SPONSORED RESEARCH/DEVELOPMENT

Not Applicable

BACKGROUND OF THE INVENTION

The present invention relates generally to devices used in the preparation of food, and more particularly to a peeler apparatus with a blade that can be quickly and easily oriented in a plurality of positions to facilitate the peeling of diverse food products by a variety of users.

As is well known to persons engaged in food preparation, it is not always necessary or desirable to use the outer skins and/or other surfaces of fruits, vegetables, and other food products in the preparation of a given dish. In this regard, it is often incumbent upon the food preparer to peel away these portions of such food products in the course of preparing a meal.

To this end, a variety of devices exist which facilitate the peeling of food products. Many such prior art peelers have blades that are fixed relative to their handles. However, the preferred position of the blade relative to the handle of a peeler can differ among various cultures. For example, in the United States, it is often preferred that a peeler blade be positioned parallel to the handle. In contrast, in certain Asian cultures, it is often preferred that the peeler blade be positioned perpendicular to the handle. Thus, the fixed blade of many prior art peelers can render the devices difficult to use by many persons, depending on the peeling style desired by the user and the type of food being peeled.

Moreover, peeler blades are often sharpened on only one side. As a result, peelers having fixed blades may be suitable for use by only right-handed or only left-handed persons. The combination of a single-sided blade and a fixed blade position can also limit the usefulness of such peelers among users having different peeling styles.

As a partial solution to these problems, certain prior art peelers employ a double blade design. Although such blades may permit use by both right-handed and left-handed persons, they can also compromise the peeling efficiency of devices having this configuration. Specifically, as the double blade is drawn along a food product, the back of the leading blade can cause the cutting edge of the blade to "lift," thus compromising the "bite" of the blade. It will be appreciated that while prior art double blade configurations may provide consumers with additional functionality, such configurations will not necessarily cut as well as single sided blade designs.

In view of the above, there exists a need for a peeler apparatus with a blade that can be easily configured in a plurality of positions, thereby permitting use of the peeler in accordance with a variety of peeling styles. Such a peeler apparatus would also preferably be adaptable for use by both left and right-handed persons.

BRIEF SUMMARY OF THE INVENTION

The present invention, roughly described, is directed to a peeler apparatus having a blade that can be rotated to a variety of positions relative to a handle of the peeler. In certain embodiments, the blade can be rotated from a position generally parallel to the handle, to a position generally perpendicular to the handle. In other embodiments, the blade can be rotated approximately 180 degrees relative to the handle.

In one embodiment, the peeler comprises a handle having proximal and distal ends, with an aperture located at the proximal end. A yoke is rotatably engaged with the handle through the aperture of the handle. A user-operable knob cooperatively engaged with the yoke permits the yoke and a blade secured to the yoke to rotate relative to the handle in response to a user's rotation of the knob.

In various embodiments, the yoke can be implemented as an arch member having an integral cylindrical support member projecting through the aperture of the handle. An aperture in the cylindrical support member and the arch member can receive a male member portion of the knob, thereby cooperatively engaging the knob with the yoke. In order to facilitate the positioning of the yoke and blade relative to the handle of the peeler, notches can be provided on an external surface of the cylindrical support member for receiving a pin protruding into the aperture of the handle.

In accordance with the present invention, various ergonomic features can be incorporated into the handle of the peeler, as further described herein.

In other embodiments, the peeler can employ a blade fixed at approximately 45 degrees relative to the handle.

These and other embodiments of the present invention are discussed in further detail below.

BRIEF DESCRIPTION OF THE DRAWINGS

FIG. 6 illustrates a bottom exploded view of a knob, base, and yoke of a peeler apparatus in accordance with an embodiment of the present invention.

FIG. 7 illustrates a top exploded view of a knob, base, and yoke of a peeler apparatus in accordance with an embodiment of the present invention.

Common reference numerals are used throughout the drawings and detailed description to indicate like elements.

DETAILED DESCRIPTION OF THE INVENTION

Figure 1:
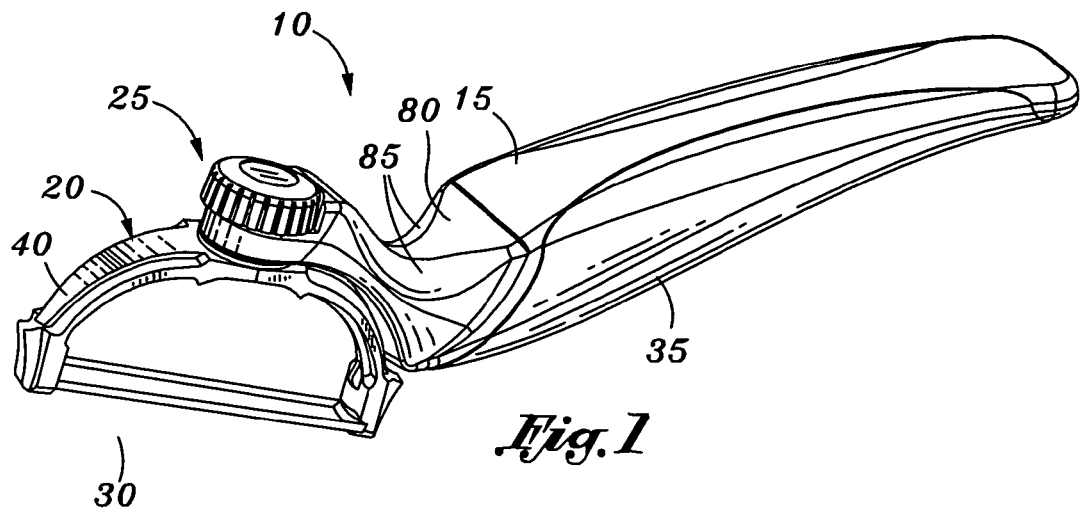
FIG. 1 illustrates a perspective view of a peeler apparatus having a blade oriented in a generally parallel position relative to a handle of the peeler in accordance with an embodiment of the present invention.

FIG. 1 illustrates a perspective view of a peeler apparatus 10 in accordance with an embodiment of the present invention. As set forth in FIG. 1, peeler 10 includes a handle 15 and a user-grippable sleeve 35 surrounding a portion of the handle 15. A yoke 20 is also provided, and can be rotatably engaged with handle 15. A blade 30 is secured to yoke 20 and will rotate with yoke 20. In various embodiments, the blade 30 can be made from ceramic or metal material, sharpened on only one side, and/or configured for peeling fruits and vegetables. It will be appreciated that, although peeler 10 is preferably implemented as a fruit and vegetable peeler, other uses are also contemplated.

Peeler 10 provides a user-operable knob 25 that can be cooperatively engaged with yoke 20. As a result of the engagement between knob 25 and yoke 20, blade 30 can rotate with yoke 20 in response to the rotation of knob 25. Thus, a user of peeler 10 can rotate yoke 20 and blade 30 relative to handle 15 by turning knob 25 in a desired direction.

Figure 2:
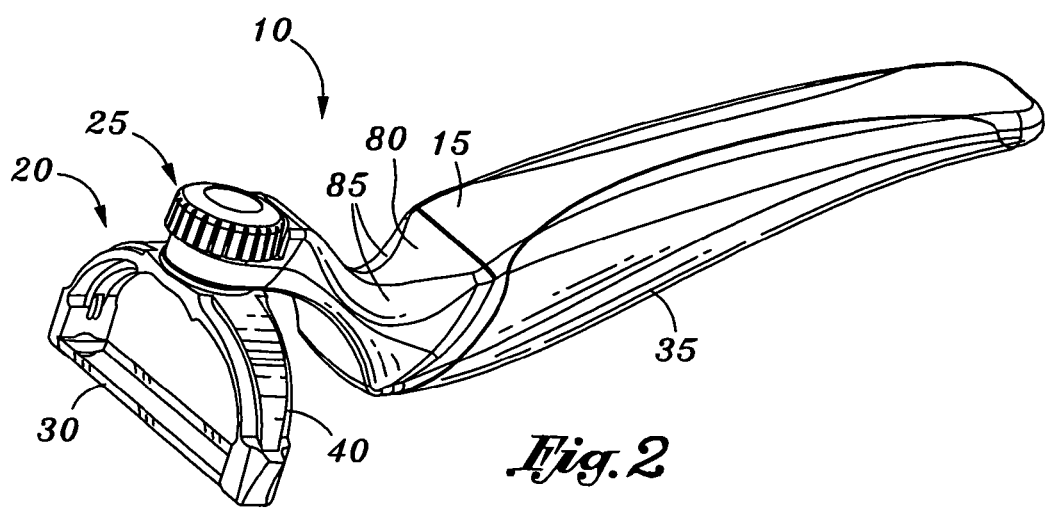
FIG. 2 illustrates a perspective view of a peeler apparatus having a blade oriented in a generally perpendicular position relative to a handle of the peeler in accordance with an embodiment of the present invention.

In the embodiment provided in FIG. 1, blade 30 is illustrated as being positioned generally parallel to handle 15 of peeler 10. If knob 25 is rotated by approximately 90 degrees, the blade 30 and yoke 20 will rotate to a second position wherein the blade 30 is generally perpendicular relative to handle 15. This second position is illustrated in the perspective view of the peeler 10 provided in FIG. 2. Although FIGS. 1 and 2 illustrate the yoke 20 and blade 30 in generally parallel and generally perpendicular positions, respectively, it will be understood that peeler 10 can be implemented to permit a full 180 degree rotation of the yoke 20 and blade 30 relative to handle 15.

In various embodiments, blade 30 and yoke 20 can be rotated to five distinct positions relative to handle 15, namely: (1) perpendicular; (2) parallel left; (3) parallel right; (4) 45 degree left; and (5) 45 degree right positions. As previously described, a perpendicular position is illustrated in FIG. 2. By rotating blade 30 and yoke 20 from the perpendicular position, the four additional positions described above can be achieved. Specifically, the 45 degree left and 45 degree right positions can be achieved by rotating knob 25 to turn the blade 30 and yoke 20 approximately 45 degrees to the left and 45 degrees to the right, respectively, relative to the perpendicular position. The parallel left position can be achieved by rotating knob 25 to turn the blade 30 and yoke 20 an additional 45 degrees to the left from the 45 degree left position. Similarly, the parallel right position can be achieved by rotating knob 25 to turn the blade 30 and yoke 20 an additional 45 degrees to the right from the 45 degree right position.

The 45 degree left and 45 degree right positions provide unique advantages to the parallel and perpendicular positions described above. Specifically, the inventors of the present disclosure have recognized that the 45 degree left and 45 degree right positions permit users of peeler 10 to operate the device with the user's arms and elbows disposed in a more relaxed position in comparison to when the device is operated with blade 30 oriented in the parallel and perpendicular positions. Alternate embodiments are also possible wherein blade 30 is fixed relative to handle 15, with the blade 30 exhibiting an approximately 45 degree angle relative to the handle 15.

Figure 3:
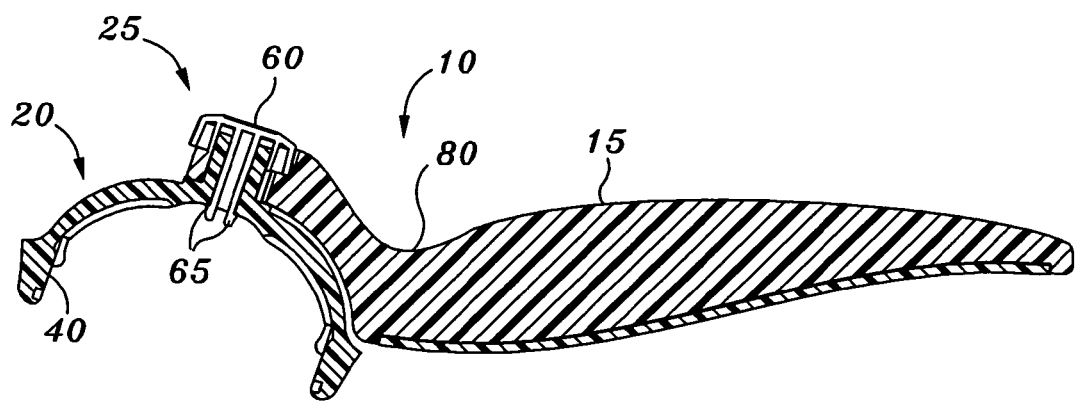
FIG. 3 illustrates a cross-sectional view of a peeler apparatus in accordance with an embodiment of the present invention.
Figure 4:
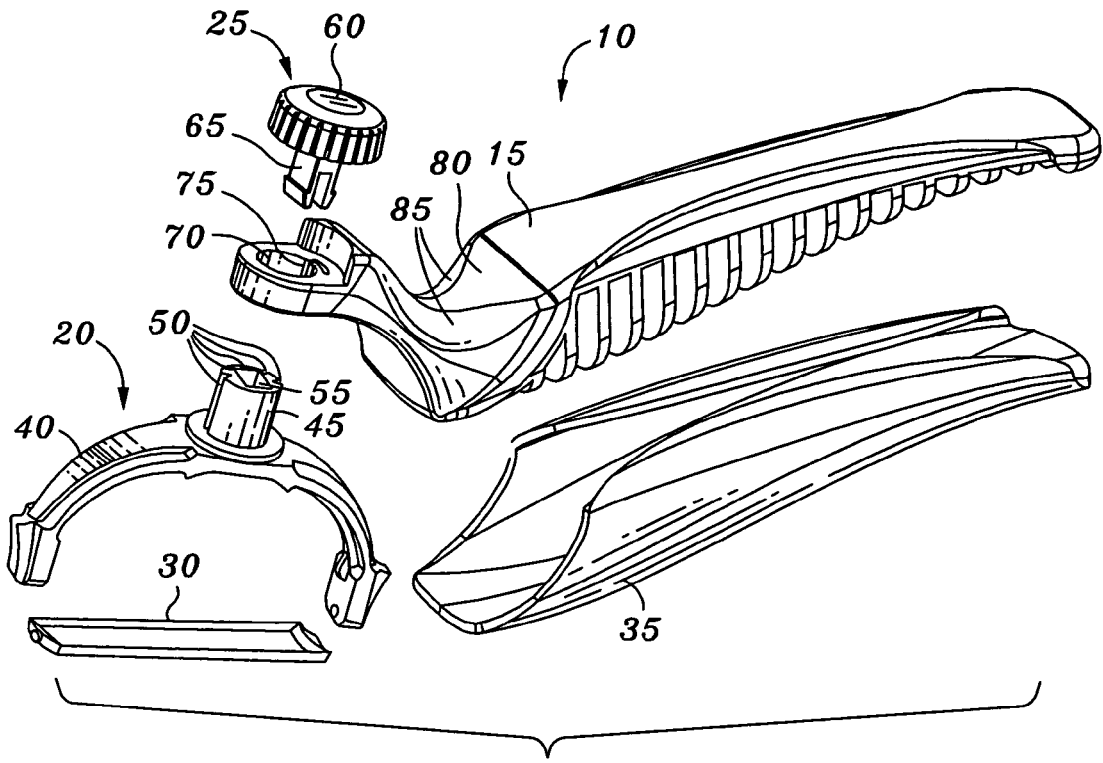
FIG. 4 illustrates a perspective exploded view of a peeler apparatus in accordance with an embodiment of the present invention.
Figure 5:
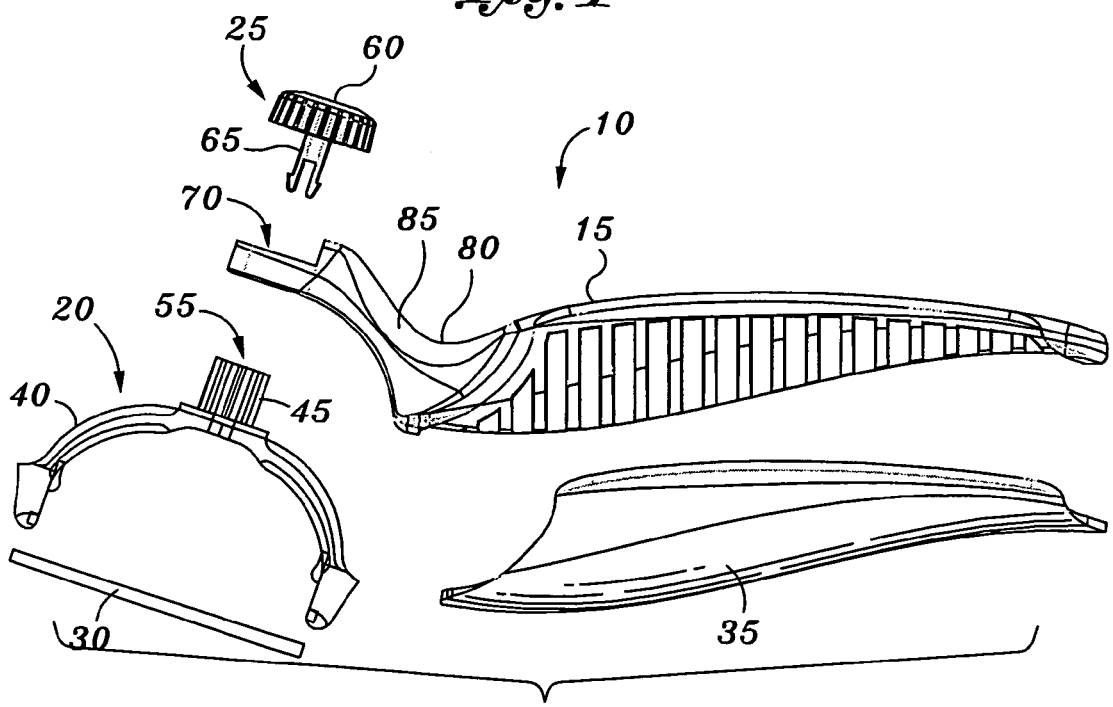
FIG. 5 illustrates a side exploded view of a peeler apparatus, in accordance with an embodiment of the present invention.

FIG. 3 illustrates a cross-sectional view of the peeler 10 in accordance with an embodiment of the present invention. For convenience of illustration only, the blade 30 does not appear in the cross-section of FIG. 3. The other aspects of peeler 10 identified in FIG. 3 will be further explained by the description of FIGS. 4–7 as set forth herein.

The exploded views of FIGS. 4–7 reveal additional aspects of peeler 10. As illustrated, knob 25 includes a cap portion 60 and a male member 65 extending from the cap portion 60. Yoke 20 is comprised of an arch member 40 and a cylindrical support member 45 integral to the arch member 40. Yoke 20 also includes an aperture 55 which extends from the top of cylindrical support member 45 through the bottom of arch member 40. Aperture 55 is sized to receive male member 65 of knob 25, thereby permitting knob 25 to cooperatively engage yoke 20.

Handle 15 exhibits proximal and distal ends, with an aperture 70 provided at the proximal end. Aperture 70 can be sized to receive cylindrical support member 45, thus permitting member 45 to be inserted into handle 15 and project through aperture 70.

Thus, from the exploded views set forth in FIGS. 4–7, it will be appreciated that the various elements of peeler 10 can be assembled together by securing blade 30 to yoke 20, inserting yoke 20 into handle 15, inserting knob 25 into yoke 20, and inserting handle 15 into sleeve 35.

Handle 15 provides several ergonomic features which facilitate the use of peeler 10. As illustrated in FIGS. 1–5, handle 15 exhibits a tapered shape, permitting operation by users with both large and small hands. In addition, as variously illustrated in FIGS. 1–5 and 7, the proximal end of handle 15 exhibits an indentation 80 on the top surface of the handle 15. It will be appreciated that if a user of peeler 10 chooses to grasp the handle 15 with the user's thumb on top, indentation 80 provides a convenient location suitable for placement of the user's thumb, facilitating the user's control of the peeler 10.

As variously illustrated in FIGS. 1–2 and 4–7, the proximal end of handle 15 exhibits additional indentations 85 on the left and right sides of the handle 15. It will be appreciated that if a user of peeler 10 chooses to grasp the handle 15 with the user's thumb on the side of handle 15, indentations 85 provide convenient locations suitable for the placement of the user's thumb and finger on opposite sides of the handle 15.

In operation, a user of peeler 10 can select the desired orientation of blade 30 by rotating knob 25 in an appropriate direction. For example, if the blade 30 is oriented in a position generally perpendicular to the handle 15 (as illustrated in FIG. 2), a user may rotate the cap 60 of knob 25 in a clockwise or counter-clockwise direction. Because of the engagement of male member 65 of knob 25 with yoke 20, the yoke 20 will rotate with the knob 25. Blade 30 is secured to the yoke 20 and therefore will also rotate with the knob 25. Thus, if a user rotates knob 25 approximately 90 degrees, the blade 30 and yoke 20 will also rotate approximately 90 degrees to a generally parallel position relative to handle 15 (as illustrated in FIG. 1).

The positioning of yoke 20 and blade 30 relative to handle 15 is facilitated by the interaction of pin 75 with notches 50. As illustrated, handle 15 provides a pin 75 that protrudes into aperture 70 of handle 15. Cylindrical support member 45 includes a plurality of notches 50, each of which are sized to receive pin 75. As previously described herein, cylindrical support member 45 of yoke 20 can be inserted into handle 15 through aperture 70. While so inserted, the rotation of yoke 20 will cause the cylindrical support member 45 to rotate within aperture 70. When one of the notches 50 rotates to a position adjacent to pin 75, the notch 50 will receive the pin 75 and thereby engage the pin 75 with the notch 50.

As a result of the engagement between pin 75 and the adjacent notch 50, yoke 20 will exhibit resistance to further rotation. This resistance permits a user of peeler 10 to set the yoke 20 and blade 30 to one of the notched positions and use the peeler 10 for food preparation without causing significant rotation of the yoke 20 or blade 30 during use. If another orientation of blade 30 is desired, the user can rotate knob 25 with sufficient force to overcome the resistance provided by the engagement of pin 75 with the adjacent notch 50. If sufficient force is applied to knob 25, pin 75 will disengage from the adjacent notch 50 and engage the next notch 50 which rotates to a position adjacent to pin 75.

It will be appreciated that the engagement and disengagement of pin 75 with notches 50 as described above can permit a user to set the yoke 20 and blade 30 to any of the positions provided by notches 50, and use the peeler 10 in such positions as desired. Appropriate notches 50 can be provided on the external surface of the cylindrical support member 45 in order to permit particular blade positions (for example, parallel, perpendicular, and 45 degree positions) to be maintained during use of the peeler 10.

In view of the disclosure provided herein, it will be appreciated that yoke 20 and blade 30 of peeler 10 can be selectively rotated to any desired position relative to handle 15. As a result, the peeler 10 can be used by persons preferring parallel, perpendicular, or other orientations of blade 30 relative to handle 15. In addition, if blade 30 is implemented as a single-sided blade, yoke 20 and blade 30 can be rotated relative to handle 15 by knob 25, thereby permitting use of the peeler 10 by both left-handed and right-handed users.

It will be appreciated that the scope of the present invention is not limited by the particular embodiments set forth herein. For example, in alternate embodiments, any desired maximum angle of rotation can be employed, including approximately 180 degrees and/or approximately 360 degrees. Other appropriate variations, whether explicitly provided for or implied, are contemplated by the present disclosure.

What is claimed is:

1. A peeler apparatus comprising:
  a handle, comprising:
    a proximal end,
    a distal end, and
    an aperture passing transversely through said handle at said proximal end;
  a yoke rotatably engaged with said handle through said aperture of said handle, said yoke including a support member projecting through said aperture of said handle, said yoke further including a yoke aperture disposed within the support member, said yoke aperture defining a non-circular cross section;
  a blade secured to said yoke; and
  a knob cooperatively engaged with said yoke, said knob including a cap portion and a male member extending from the cap portion, said male member having a non-circular cross-section being sized and configured to cooperatively engage said yoke aperture for imparting rotational movement from said knob to said yoke, said yoke and said blade being rotatable relative to said handle in response to rotation of said knob.

2. The peeler of claim 1, wherein said blade can rotate approximately 180 degrees in response to said rotation of said knob.

3. The peeler of claim 2, wherein said blade can rotate from a first position to a second position, wherein said first and second positions are selected from the group consisting of:
  a position approximately perpendicular to said handle;
  a position approximately 45 degrees clockwise relative to said perpendicular position;
  a position approximately 45 degrees counter-clockwise relative to said perpendicular position;
  a position approximately 90 degrees clockwise relative to said perpendicular position; and
  a position approximately 90 degrees counter-clockwise relative to said perpendicular position.

4. The peeler of claim 1, wherein said yoke further comprises an arch member integral to said support member.

5. The peeler of claim 4, wherein said support member of said yoke is configured as a cylindrical support member.

6. The peeler of claim 5, wherein said handle further comprises:
  a pin protruding into said aperture of said handle.

7. The peeler of claim 6, further comprising:
  a plurality of notches on an external surface of said cylindrical support member for receiving said pin upon rotation of said knob from a first position to a second position.

8. The peeler of claim 1, further comprising:
  a user-grippable sleeve surrounding at least a portion of said handle.

9. The peeler of claim 1, wherein said blade is a ceramic blade.

10. The peeler of claim 1, wherein said blade is a metal blade.

11. The peeler of claim 1, wherein only one side of said blade is sharpened.

12. The peeler of claim 1, wherein said blade is configured for peeling fruits and vegetables.

13. The peeler of claim 1, wherein said handle further comprises:
  a first indentation in a top surface of said proximal end of said handle, wherein said first indentation is adapted to receive a user's thumb while said user is holding said peeler.

14. The peeler of claim 1, wherein said handle further comprises:
  a first indentation in a first side surface of said proximal end of said handle, wherein said first indentation is adapted to receive a user's thumb while said user is holding said peeler; and
  a second indentation in a second side surface of said proximal end of said handle, wherein said second indentation is adapted to receive said user's finger while said user is holding said peeler.

15. The peeler of claim 1, wherein said blade can rotate approximately 360 degrees in response to said rotation of said knob.

16. A peeler apparatus comprising:
  a handle including an aperture passing transversely through said handle at a proximal end thereof and a pin protruding into said aperture of said handle;
  a yoke including a support member projecting through said aperture of said handle providing rotatable engagement with said handle, said support member including a plurality of notches on an external surface of said support member for receiving said pin upon rotation of said yoke from a first position to a second position;

a blade secured to said yoke; and a knob cooperatively engaged with said yoke, whereby said yoke and said blade can rotate relative to said handle in response to rotation of said knob.

17. The peeler of claim 16, wherein said yoke further comprises an arch member integral to said support member.

18. A peeler apparatus comprising:
a handle including an aperture passing transversely through said handle at a proximal end and a pin protruding toward said aperture of said handle;
a yoke including a cylindrical support member projecting through said aperture of said handle for rotatably engaging the yoke to the handle, the cylindrical support member being sized and configured to engage the pin thereby fixedly securing the yoke to the handle at a plurality of positions, said yoke further including a yoke aperture disposed within the cylindrical support member, said yoke aperture defining a non-circular cross section;
a blade secured to said yoke; and
a knob cooperatively engaged with said yoke, said knob including a cap portion and a male member extending from the cap portion, said male member having a non-circular cross-section being sized and configured to cooperatively engage said yoke aperture for imparting rotational movement from said knob to said yoke, said yoke and said blade being rotatable relative to said handle in response to rotation of said knob.

19. A peeler apparatus comprising:
a handle, comprising:
    a proximal end,
    a distal end, and
    an aperture located at said proximal end;
a yoke rotatably engaged with said handle through said aperture of said handle, said yoke including a cylindrical support member projecting through said aperture of said handle, said yoke further including an arch member integral to said cylindrical support member, said yoke further including an aperture in said cylindrical support member and said arch member;
a blade secured to said yoke; and
a knob cooperatively engaged with said yoke, said knob including a cap portion and a male member extending from the cap portion, said male member being receivable into said aperture of said cylindrical support member and into said arch member, thereby cooperatively engaging said knob with said yoke, said yoke and said blade being rotatable relative to said handle in response to rotation of said knob.

20. A peeler apparatus comprising:
a handle including an aperture located at a proximal end thereof and a pin protruding into said aperture of said handle;
a yoke including a cylindrical support member projecting through said aperture of said handle providing rotatable engagement with said handle, said cylindrical support member including a plurality of notches on an external surface of said cylindrical support member for receiving said pin upon rotation of said yoke from a first position to a second position; and
a blade secured to said yoke; and
a knob cooperatively engaged with said yoke, whereby said yoke and said blade can rotate relative to said handle in response to rotation of said knob.

* * * * *